3,741,865
APPARATUS FOR MAKING A CONTINUOUS
SHEET BY FILTRATION OF PARTICLES IN
SUSPENSION IN A LIQUID
Pierre Lejeune, Grenoble, France, assignor to
Creusot-Loire, Paris, France
Continuation-in-part of application Ser. No. 5,225,
Jan. 23, 1970. This application Apr. 11, 1972, Ser.
No. 242,934
Int. Cl. D21f 1/00
U.S. Cl. 162—317      6 Claims

ABSTRACT OF THE DISCLOSURE

A continuous sheet is formed by filtration of particles in suspension in a liquid on a moving filter screen sloping downwardly in its direction of movement. The slope of the screen and the amount of space above the screen are selected to provide a progressive increase in the pressure acting on the filtrate to give a uniform filtrate extraction along the length of the screen.

REFERENCE TO RELATED APPLICATION

My copending application Ser. No. 2,193 filed Jan. 12, 1970, entitled "Process and Apparatus for the Control of Pressures for the Formation of a Sheet or Layer by Continuous Filtration of Particles in Suspension", now Pat. No. 3,631,982, discloses subject matter referred to hereinafter while this application is a continuation-in-part of my application Ser. No. 5,225, filed Jan. 23, 1970 with the same title, now abandoned.

BACKGROUND OF THE INVENTION

The manufacture of continuous sheets from particles such as paper fibers or textiles in a liquid usually requires, when the concentrations of particles are low, a method in which the suspension is taken to an enclosure in which one of the walls is an endless screen moving at a constant speed on which the particles are deposited by continuous filtration, the amount of the suspension required then being directly dependent upon the resistance to extration of the filtrate through the screen; through the layer of particles retained on the screen; and upon the force driving the filtrate through the screen.

The industries which use this method to obtain continuous sheets of particles or of solid elements have more or less severe problems relating to the regularity of weight or of the thickness of the sheets; the arrangement of the particles and their more or less regular orientation, certain uses requiring a particular orientation of particles in the direction of manufacture or requiring an isotropic distribution of the particles; the arrangement of the particles in the thickness of the layer to avoid surface effects, that is, any difference of appearance or structure between the two surfaces of the sheet; retention of fine elements contained in the particles; other specific characteristics such as the hand (ratio between the thickness and unitary weight), porosity, ratio of transverse-length resistance, ratio of resistance to rupture and to tearing, bursting index or Mullen index, and the like.

Control of the parameters which control the characteristics of the formed sheet depend essentially on control of filtration conditions over the surface of formation of the sheet.

In particular, it is usually desirable to be able to regulate the distribution of the amount of filtration over the length of the filter wall and to be able to increase or reduce this filter length as desired.

An excessive local speed of filtration may cause excessive entraining of fine particles in the filtrate or unduly increase the porosity of the sheet and/or to change the characteristics of the surfaces of the sheet.

A local excessively slow speed of filtration can excessively reduce the cohesion of the particles deposited on the surface or excessively warp the layer.

Poor distribution of the amounts of filtration along the length of the filter zone can result in incorrect local relative speeds between the screen and the suspension resulting in an undesirable orientation of long particles by a combing effect.

In most cases, simultaneous meeting of these different requirements requires uniformity in the amount of filtrate extracted over the surface of formation of the sheet or conditions which are very approximate to such uniformity and which can be regulated.

It is known that resistance to filtering increases with the unitary weight of the deposited filter layer and occurs along the length of the filter. Uniformity in the amounts of extracted filtrate therefore requires a progressive increase in the force exerted on the filtrate along the length of the filter.

When the particles are incompressible, the required increase in the forces acting on the filtrate to obtain a uniform distribution of the amount of extracted filtrate may have a linear characteristic. On the other hand, when the filtered layer of particles in compressible, which is usually the case with paper fibers, uniformity in the amount of filtrate removed may require an increase in the forces acting along the length of formation in accordance with the formula:

$$Hs = Ho + Ks^a$$

in which $Ho$ is the force acting on the filtrate at the point of origin of filtration, $Hs$ represents the force on the filtrate at a distance $s$ from the point of origin of filtration, $K$ is a constant function of the filter parameters and $\alpha$ is an exponent equal to or greater than one.

SUMMARY OF THE INVENTION

The present invention therefore has as an object a process for manufacturing a continuous sheet by filtration of particles in a liquid suspension in which a descending circulation of charge is provided along a moving filter screen downwardly inclined in the direction of its movement, the slope of the screen in the direction of circulation being constant for incompressible particles and progressively increasing for compressible particles so that the progressive increase of the natural hydrostatic height of the suspension (motive force of filtrate extraction) along the filter screen is obtained in accordance with the preceding law with an exponent equal to one in the case of incompressible particles and greater than one in the case of compressible particles to obtain an amount of filtrate extraction in accordance with a predetermined law over the surface of formation of the sheet or, more particularly, a uniform extraction of filtrate.

The invention also has for an object to provide apparatus for carrying out this process comprising a conduit bringing the suspension to an enclosure with a free surface for the suspension therein, means for formation of the sheet including a conduit inclined toward the base or bottom of the enclosure, the enclosure including two lateral walls, an upper transverse wall and a lower wall formed in part by an endless moving screen moving toward the bottom, supports for the screen so disposed as to give the screen a form corresponding to a predetermined variation of the filtrate extraction force, a tank for the reception of the filtrate, the upper wall of the conduit having a form coordinated with that of the lower filter wall so that the section therebetween decreases downstream toward the discharge orifice of the formed sheet and with sealing means provided at the orifice.

It is necessary that the flow occurs at a controlled speed along the length of the screen in relation to the speed of the screen. To this end, the wall above the screen is given a suitable profile to provide a decreasing section with respect to the screen in the direction of flow in accordance with a predetermined law, for example, that corresponding to a constant speed of the suspension.

The positive or negative pressure above the surface of suspension or beneath the filter surface can be varied to modify as desired the effective value of the hydrostatic presure along the length of filtration without modificaion of the height of the free surface.

The form of the screen may also be varied to adapt the machine to particular conditions of work.

As disclosed in my pending application filed Jan. 12, 1970, and entitled "Process and Apparatus for the Control of Pressures for the Formation of a Sheet or Layer by Continuous Filtration of Particles in Suspension," above referred to, the positive or negative pressure above the suspension can be varied to regulate loss where the sheet leaves the apparatus without requiring sealing means at the orifice through which the sheet is drawn. The positive or negative pressure beneath the filter surface can be adjusted in conformation therewith to provide a differential pressure for extraction of the filtrate acting either above or below the filter surface.

BRIEF DESCRIPTION OF THE DRAWINGS

The characteristics and improvements of the present invention will now be apparent from the following description of the preferred embodiments of the present concept with reference to the accompanying drawings, in which like reference characters indicate like parts. In the drawings.

DESCRIPTION OF PREFERRED EMBODIMENTS

Figure 1:
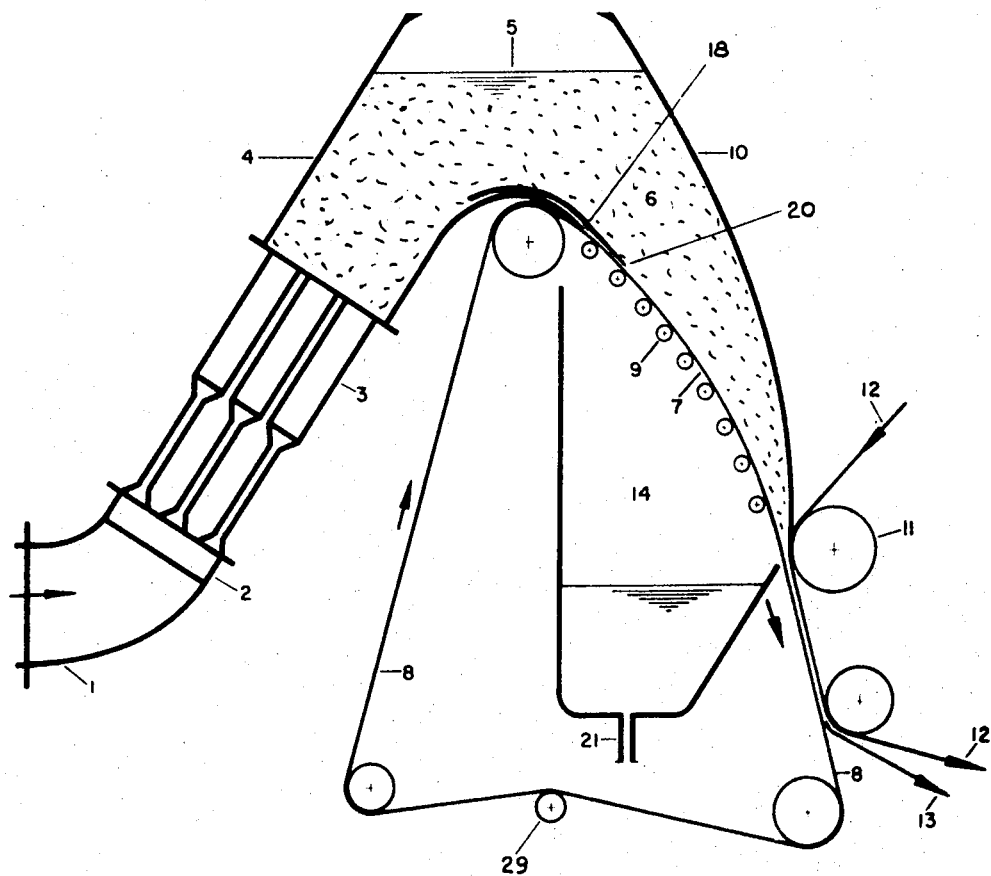
FIG. 1 is a vertical sectional view of a paper making machine in accordance with a preferred embodiment of the invention.

With reference now to FIG. 1, a conduit 1 brings the suspension from a mixing station and is followed by a chamber 2 in which the suspension flows to a multi-tube distributor 3 which equalizes the suspension across the cross-section of enclosure 4.

After passage from tubes 3 to free surface 5, the suspension is moved downwardly in conduit 6 having a lower wall 7 defined by an endless screen 8 which is moved at a constant speed.

The profile of lower wall 7 is established by a series of support 9 which may be either rotating or fixed bars, disposed in a contour providing the desired change of hydrostatic height along the length of the filter zone, that is, a change such that a uniform total of amount of filtration is obtained over the filter surface.

This uniform total amount of filtration can be obtained by regulation of level 5 of the suspension at a height such that the minimum hydrostatic height at the upper extremity 20 of the filter surface corresponds to the filtration resistance of the screen for the desired amount of filtration.

As illustrated in FIG. 1, the front wall 10 of the enclosure is profiled in such a way that the speed of flow of the suspension toward the right of the filter zone has at all points a constant value with respect to the speed of the endless screen 8.

The end of conduit 6 is closed by a rotating roller 11 over which an endless band 12 passes which band presses the layer of particles 13 aginst the endless screen 8 in the removal zone.

The lower side of endless screen 8 in filter zone 7 is open to atmosphere above a receiving tank 14 which receives the filtrate and which includes a discharge 21.

The upper end of the filter wall may be provided with a flexible wall 18 which may be regulated as to position for varying the position of the point 20 at which filtration starts and therefore varys the length of filtration providing an adjustment to the resistances of filtrate extraction depending upon the end product.

Figure 2:
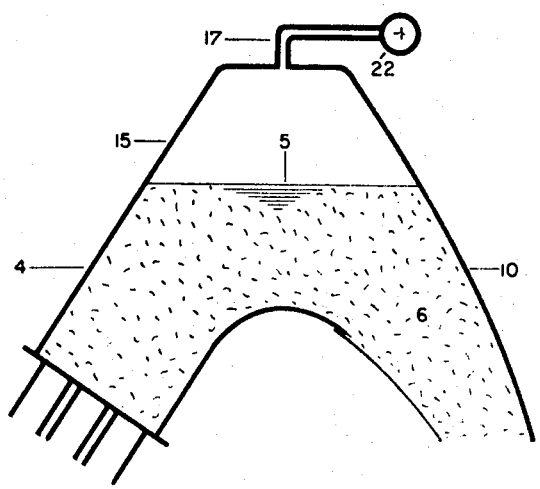
FIG. 2 is another embodiment of the invention in which the free surface of the suspension is subject to a positive or negative controlled pressure.

In the embodiment of FIG. 2, the enclosure 4 is closed at its upper part by a cover 15 at a predetermined distance from the free surface 5 in such a way that the free surface can be placed under a positive or negative pressure by means of conduit 17 and pressure or vacuum pump 22 to regulate, as desired, the effective value of the hydrostatic charge over the length of filtration without change of the free surface, the amount of discharge downstream being adjusted as desired by control of the displacement of roller 11 as shown in FIG. 1.

Figure 3:
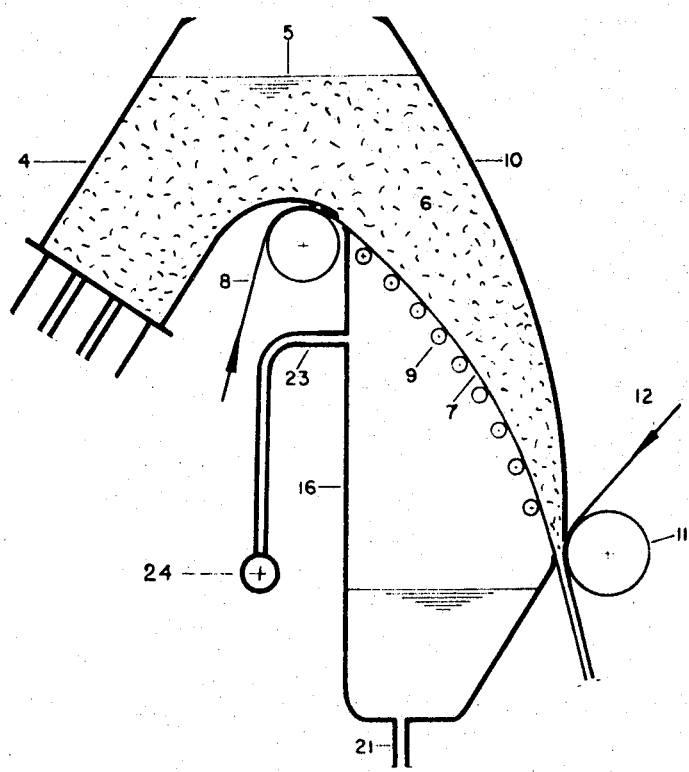
FIG. 3 is another embodiment of the invention in which the lower surface of the filter is subjected to a positive or negative controlled pressure.

In the embodiment of FIG. 3, the lower part of the endless screen 8 in the filter zone 7 is disposed above a closed tank 16 in which a positive or negative pressure can be established by conduit 23 and pressure or vacuum pump 24 to modify as desired the effective value of the hydrostatic charge along the filter without change in the height of the free surface.

Figure 4:
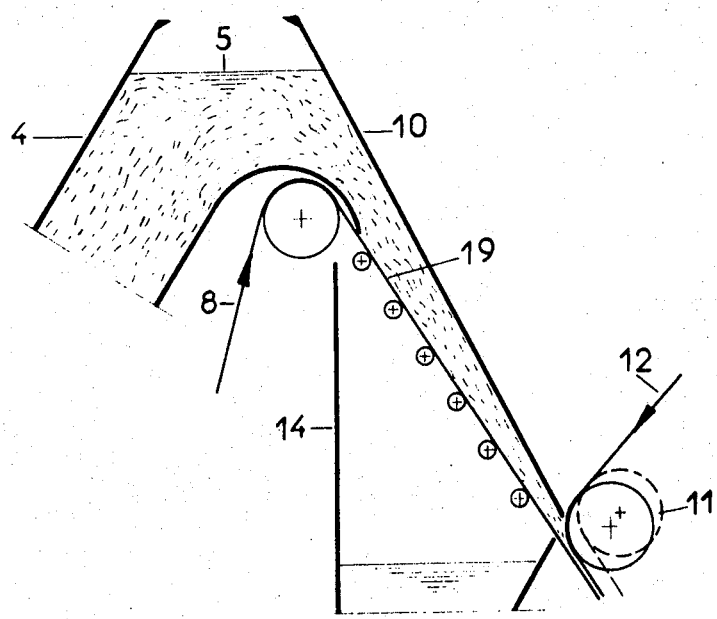
FIG. 4 is another embodiment similar to that of FIG. 1.

The embodiment of FIG. 4 is a simplified construction of the present invention particularly adapted to non-compressible particles and to filtration of a viscous flow for which the resistance to filtrate extraction increases linearly as a function of the thickness of the layer and consists of a straight line filter 19 which slopes downwardly at an appropriate angle and includes the endless screen 8.

Figure 5:
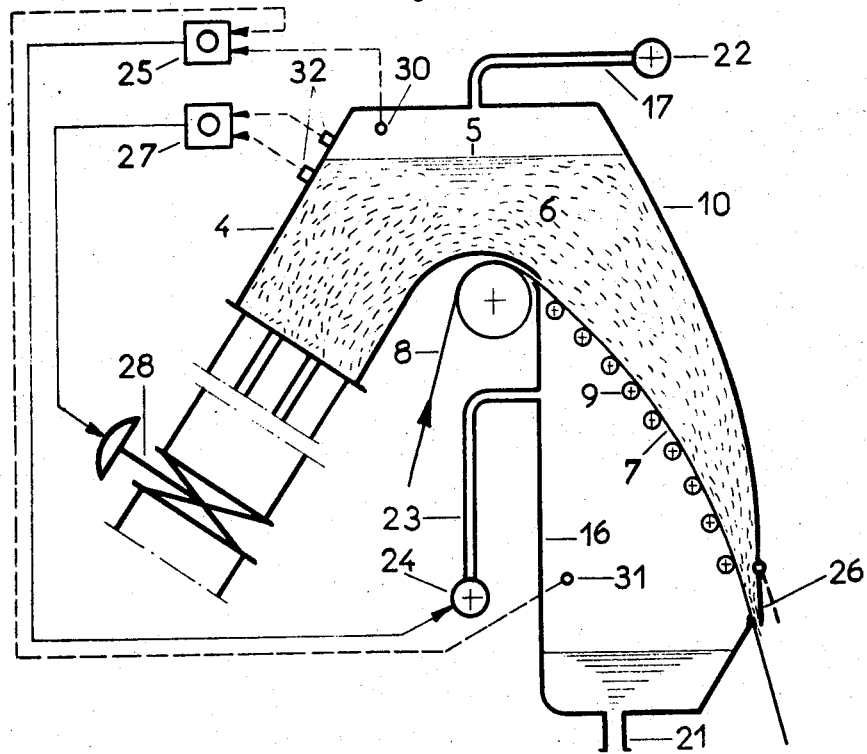
FIG. 5 is an embodiment similar to that of FIG. 1 in which a positive or negative controlled pressure is exerted above the free surface of the suspension and beneath the filter.

The embodiment of FIG. 5 relates to the disclosure of my application above referred to in which the free surface 5 is subjected to a positive or negative pressure by means of conduit 17 and pressure or vacuum pump 22, while the lower surface of the screen is subjected to a positive or negative pressure in tank 16 by conduit 23 and pressure or vacuum pump 24, these pressures being correlated by a differential regulator 25, regulator 25 being controlled by pressure detectors 30 and 31.

Direct regulation is therefore provided of the amount leaving the device by acting on the pressure above level 5, the value of the pressure differential for filtrate extraction on one side or the other of the filter being controlled by differential regulator 25 which controls the pressure in tank 16.

Using this construction, mechanism can be eliminated for controlling and sealing the passage for removal of the sheet at the end of conduit 6, including roller 11 and this mechanism can be replaced by a controlled lip 26 leaving a space above the sheet.

A constant height 5 can be provided in the enclosure 4 by means of regulator 27 controlled by two sensors 32 acting on valve 28 controlling the admission of the suspension into enclosure 4.

The present concept is adaptable for suspensions of varying compositions by modifying the form of filter wall 7 of FIGS. 1, 3 and 5 by changing the positions of rollers 9 combined with movement of the tension roller 29 of FIG. 1.

In the several embodiments of the present concept it should be noted that roller 11 located at the end of the feed conduit for the suspension and forming a lower seal in the extraction zone for the sheet may have a smooth plane surface; it may be perforated for removal of liquid; it may have a plane or perforated surface covered by a felt sleeve or by a belt of felt; it may have a plane or perforated surface covered by a belt of woven fabric or permeable screen; and, if perforated, the roller may be provided with one or more aspirating ducts. The lateral sides of the enclosure in the filtration zone may be movable to regulate the width of the sheet.

The formula:

$$Hs = Ho + Ks^a$$

above referred to can be more generally expressed as:

$$Hs = Ho + f(s)$$

where $Hs$ and $Ho$ are the forces defined above, $s$ being the distance from the beginning of filtration to the point where force $Hs$ is measured and $f$ is a constant.

Figure 6:
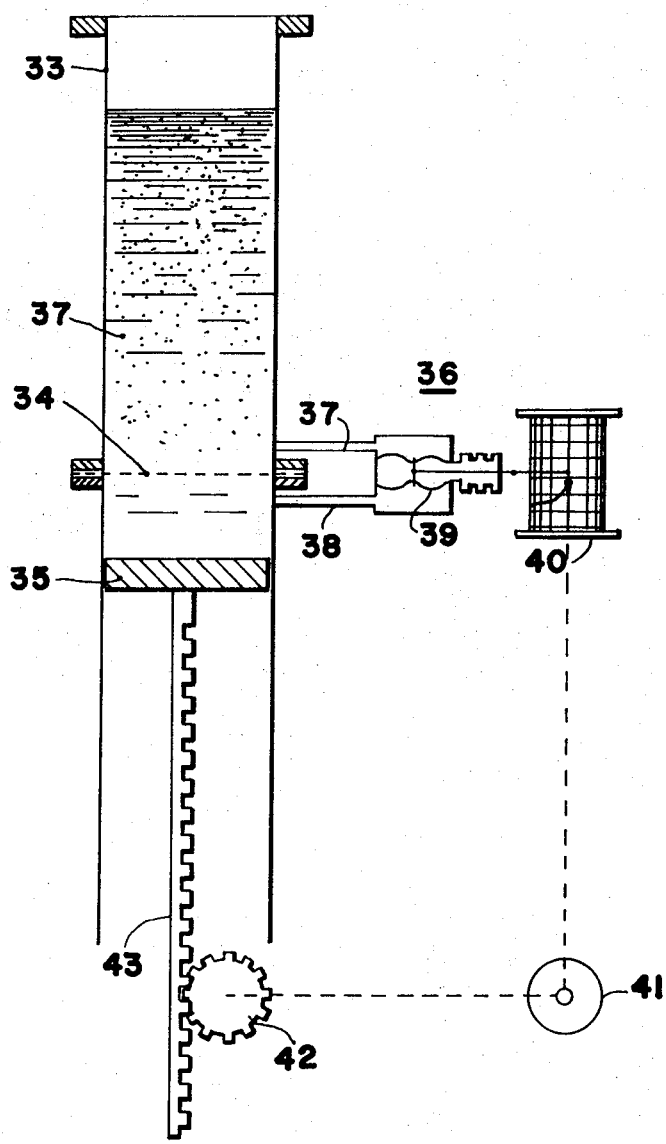
FIGS. 6 and 7 represent schematically apparatus for determining values used in the formula $Hs = Ho + KS^a$.

As seen in FIG. 6, the value of this formula may be obtained by using a vertical tube 33 having a screen 34 therein at right angles to the long axis thereof with a piston 35 closing one end of tube 33. The pressures on each side of screen 34 are read by registering differential manometer generally indicated at 36.

At the beginning of each measurement, piston 35 is raised to proximity to screen 34 and water is introduced above piston 35 so that the level of the water reaches the lower surface of screen 34.

A homogeneous suspension 37 is then introduced into cylinder 33 having the same composition as that to used in the subsequent preparation of the sheets and having a known concentration.

The piston is then moved outwardly at a known uniform speed. This progressively deposits on screen 34 a sheet of material having a quantity $q$ which is a function of the displacement of piston 35 from the point of origin. The evolution of the differences of the pressure on each side of screen 34 is then simultaneously registered as a function of the time of movement of piston 35 by manometer 36 which difference represents the force acting on the filtrate H.

Therefore, for each test, it is possible to measure directly the relationship:

$$H = f_1(g)$$

Displacement of piston 35 at a uniform speed provides a constant unitary difference of pressure during the test. This difference can be varied from one test to the other by modifying the speed of the piston.

The same experiment repeated with pure liquid in place of the suspension 37 provides the proper resistance of screen 34 for a given unitary difference, that is, a determination of the constant value $Ho$.

This test therefore determines the value $H - Ho$ and connects it to the deposit on the screen for a given unitary difference which then gives:

$$H - Ho = f_2(g)$$

In the present invention the unitary differences being identical over the length of the formation zone of the sheet, the deposit linearly being a function of $s$, the relation can then be written as:

$$g/s = G/S$$

where $G$ is the final weight of the formed sheet and $S$ is the length of the formation zone.

Placing in the preceding equations the equivalent value of $g$:

$$g = sG/S \text{ thus giving: } H = Ho + f_2(sG/S)$$

Thus for a given value of $G$ and $S$, for the same unitary difference, the desired relationship $Hs = Ho + f(s)$ is given thus providing the law of progression of the forces acting on the filtrate along the length of the filter zone.

Further with reference to the structure of FIG. 6, manometer 36 includes conduits 37 and 38 leading from each side of screen 34, respectively, to applying a pressure difference to pressure responsive device 39 which registers on drum 40. Piston 35 is driven by adjustable speed motor 41 acting through gear 42 and rack 43 and also rotates drum 40.

Figure 7:
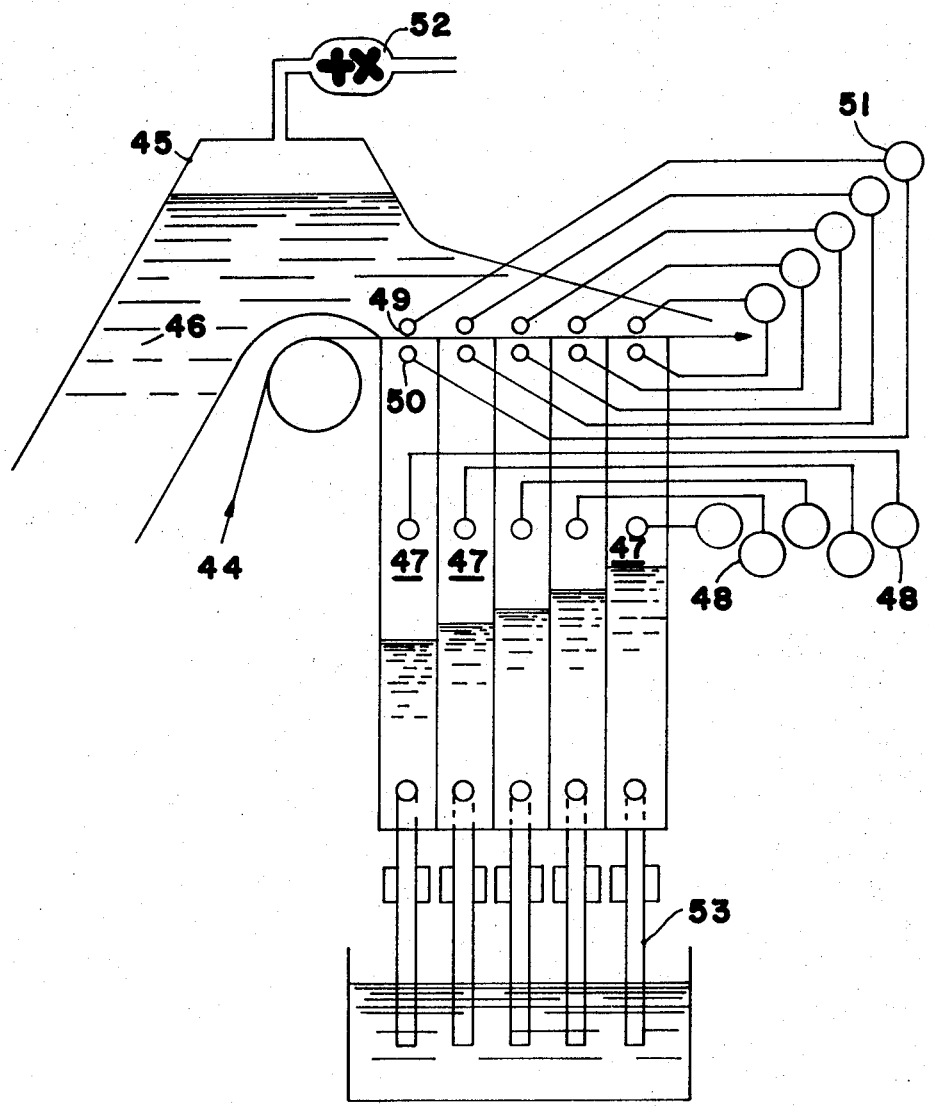

The value of this relation can also be determined by forming a sheet on a continuous device having an endless filtration screen and continuous movement within a closed casing which receives the fibrous suspension continuously. Such a construction is shown in FIG. 7 where the screen is shown at 44, the casing at 45, and the fibrous suspension at 46. A plurality of compartments 47 are disposed beneath screen 44 to measure by suitable means 48 adjustably increasing forces by stages along the length of the formation zone in the direction of displacement of the screen, pressure measuring devices 49 and 50 being located, respectively, on each side of the screen at each compartment 47.

The force acting on the filtrate H at each compartment 47 is equal to the difference of pressure between the lower face of the screen and the upper face of the sheet which is deposited on the screen within enclosure 45 and is measured by differential manometers 51. The pressure exerted on the upper face of the sheet can be regulated by means of adjustment of the pressure or negative pressure of the air cushion above the free surface of the suspension in enclosure 45 by a pump 52.

The number of compartments 47 should at least be equal to 5.

Measuring devices 53 measure the amount of liquid filtered aat each compartment 47.

Utilizing this system, a sheet of determined composition can be obtained under conditions of speed of deposit and unitary pressure differences of filtration similar to industrial fabrication with regulation of the pressure value above the sheet and the pressures in the compartments 47 in such a way that the filtration differences at each of the compartments are proportional at the corresponding surface of the screen and the unitary differences of filtration will be substantially the same over the entire formation surface.

There is thus obtained above each compartment a relation between the force acting on the filtrate $Hn$ for the compartment $(n)$ and the distance $(sn)$ of the compartment from the first compartment.

With a sufficient number of compartments, a curve can then be traced $Hs = f_3(s)$ which passes through the preceding points.

The value $Hs$ comprises the loss of charge $Ho$ through the screen for a predetermined unitary difference of filtration.

For this test, a screen identical to that which will be used during manufacture is employed so that $Ho$ has the same value for the same unitary difference.

From the preceding curve, and with the value $Ho$ determined for the same unitary difference, the value can be determined without the difficulty for $Hs - Ho = f(s)$ or $Hs = Ho + f(s)$.

The following results have been obtained in accordance with this second procedure on a screen having a length S with fibrous suspensions of different compositions.

In the first case, a sheet was obtained weighing 13 grams per square meter with a unitary filtration difference of 92 liters per second and per square meter utilizing a cellulose fibrous suspension of pure natural refined cellulose at 50° SR. The following average means values were obtained:

| Hs in mm. of a column of water: | s/S |
|---|---|
| 10 | 0 |
| 50 | 1/5 |
| 170 | 2/5 |
| 365 | 3/5 |
| 640 | 4/5 |
| 1000 | 5/5 |

In a second case a sheet was obtained weighing 12.5 grams per square meter with a unitary filtration difference of 300 liters per second and per square meter utilizing a fibrous suspension of the following composition:

| | Percent |
|---|---|
| Fibrane | 40 |
| Rayonne | 40 |
| Cellulose, natural, whitened, nonrefined | 20 |

| Hs in mm.: | s/S |
|---|---|
| 120 | 0 |
| 210 | 1/5 |
| 300 | 2/5 |
| 385 | 3/5 |
| 470 | 4/5 |
| 560 | 5/5 |

It should be noted that in the first example given above with a composition of natural, refined, pure cellulose, which acts as a compressible material, the variation of $Hs$ as a function of $s$ is in accordance with a law which may be approximated as:

$$Hs = Ho + A(s/S)^\alpha$$

where S is the length of the test screen with the same unit of length as the distance $(s)$.

It follows that int his case and with the value chosen for $Ho=10$ and $s=S$ that:

$$A = Hs - Ho/(s/S)^\alpha = 1000 - 10/(5/5)^\alpha 990$$

If the value of $\alpha$ is taken from this formula, it follows:

$$\alpha = \log(Hs - Ho/A)/\log(s/S)$$

and utilizing the value of A as 990, the following values for $\alpha$ are obtained for various values of $s/S$

| s/S: | $\alpha$ |
|---|---|
| 1/5 | 1.99 |
| 2/5 | 1.98 |
| 3/5 | 2 |
| 4/5 | 2 |
| 5/5 | 0/0 |

From this table it is seen that the average value of $\alpha$ can be considered as equal to 2.

It is seen from the second example presented above with a different composition, much less compressible, that the variation of $Hs$ as a function of $(s)$ follows a law of the following form:

$$Hs = Ho + A(s/S)\alpha$$

and with the unities above chosen, for $Ho=120$ the same calculation gives:

$$A = 440 \text{ and } \alpha = 1$$

If desired, in each of the cases $A/S^\alpha = K$, the formula can be written $Hs = Ho + Ks^\alpha$ as first referred to above.

In the case of manufacture of a sheet having the same composition as the first example above, for the same weight per m.² of the sheet of 13 g. per m.² and the same unitary difference of filtration of 92 liters/second per m.² and using, for example, a filter length S=1800 mm., it will be substantially found that:

$$K = A/(S)^\alpha = 990/(1800)^2 = 0.0003$$

In the case from formula $Hs = Ho + Ks^\alpha$, the variation of the force acting on the filtrate can be measured at the distance $(s)$ measured along the filtration zone by the relation:

$$Hs = 10 + 0.003s^2$$

expression $Hs$, $Ho$, $s$ and S in mm.

In the manufacture of a sheet of the same composition as in the second example above of 1.25 g./m.² and a unitary difference of 300 liters per second and choosing, for example, a filter length of S=1800 mm., it will be found substantially that:

$$K = A/S = 440/1800 = 0.244$$

and the following relation can be found in the same system of units the relation:

$$Hs = 120 + 0.244s$$

In the two examples considered, the relation connecting the force acting on the filtrate Hs and the corresponding distance $s$ along the filtration zone is substantially of the form:

$$Hs = Ho + Ks^\alpha$$

In the present inventive concept the change in the force acting on the filtrate is obtained directly by the slope of descent of the screen in such a way that the hydrostatic height of the suspension above the screen follows the progression of the force acting on the filtrate during the formation of the sheet. In this case, the height of the suspension above the screen with respect to a horizontal reference plane (free surface for example) follows the same variation as a function of the distance $s$ measured along the screen from the point of origin of the filtration zone.

It is therefore possible by preliminary tests in accordance with either of the methods explained above to determine for a known composition of the sheet, and a given weight and a given unitary difference of filtration what the profile of the filtration screen should be in accordance with the present invention so that the variation of hydrostatic height of the susepnsion above the different points of the screen will produce a uniform filtration.

I claim:

1. Apparatus for producing a continuous sheet by filtration of particles in suspension in a liquid comprising a duct for the suspension opening into an enclosure having a free surface for the suspension, means for forming the sheet comprising an inclined conduit in said enclosure sloping downwardly and discharging from the bottom of said enclosure, two lateral walls for said conduit, an upper transverse wall for said conduit and a lower wall for said conduit including a moving endless screen, said screen moving downwardly toward the bottom of the said enclosure at a constant or continuously increasing slope, supports for said screen so disposed as to give said screen a shape corresponding to a predetermined variation of the filtrate extraction force along said screen such that a uniform total amount of filtration is obtained over the screen, a tank receiving the filtrate from said screen, said upper wall having a slope determined by the shape of said filter wall such that the cross-section of said conduit decreases downstream toward the point of discharge of the sheet and sealing means at the point of discharge of said sheet.

2. Apparatus as described in claim 1, the shape of said upper wall of said conduit having a variation in cross-section providing a constant speed for the suspension.

3. Apparatus as described in claim 1, said upper wall of said conduit being movable at least in part to modify the speed of the suspension.

4. Apparatus as described in claim 1, said enclosure being closed above the free surface of the suspension and including means for regulating the absolute pressure above the free surface of the suspension.

5. Apparatus as described in claim 1, said filter screen being planar.

6. Apparatus as described in claim 1, including means for changing the shape of said filter screen.

References Cited

UNITED STATES PATENTS

| | | | |
|---|---|---|---|
| 3,262,841 | 7/1966 | Embry | 162—203 X |
| 3,471,367 | 10/1969 | Chupka | 162—303 |
| 3,540,981 | 11/1970 | Finnila et al. | 162—350 X |
| 3,382,143 | 5/1968 | Justus et al. | 162—303 |
| 2,718,824 | 9/1955 | Hornbostel | 162—344 |
| 3,434,922 | 3/1969 | Ely | 162—303 |
| 3,631,982 | 1/1972 | Lejeune | 210—400 X |

S. LEON BASHORE, Primary Examiner

A. D'ANDREA, JR., Assistant Examiner

U.S. Cl. X.R.

162—295, 303, 320, 350; 210—400

PO-1050
(5/69)

UNITED STATES PATENT OFFICE
CERTIFICATE OF CORRECTION

Patent No. 3,741,865      Dated June 26, 1973

Inventor(s) Pierre Lejeune

It is certified that error appears in the above-identified patent and that said Letters Patent are hereby corrected as shown below:

Foreign priority data is omitted --French No. PV 6901947, filed 1/27/69--.

Signed and sealed this 26th day of March 1974.

(SEAL)
Attest:

EDWARD M. FLETCHER, JR.
Attesting Officer

C. MARSHALL DANN
Commissioner of Patents